June 21, 1932. J. H. LEMAIRE 1,864,360
PLANT FOR THE MANUFACTURE OF SHEETS OF GLASS
Filed Nov. 21, 1928  2 Sheets-Sheet 1

JEAN HENRI LEMAIRE
INVENTOR;
By *Atto Mint*
his Attorney.

June 21, 1932.  J. H. LEMAIRE  1,864,360
PLANT FOR THE MANUFACTURE OF SHEETS OF GLASS
Filed Nov. 21, 1928   2 Sheets-Sheet 2

JEAN HENRI LEMAIRE
INVENTOR;
By Otto Munk
his Attorney.

Patented June 21, 1932

1,864,360

UNITED STATES PATENT OFFICE

JEAN HENRI LEMAIRE, OF ROUSIES, FRANCE

PLANT FOR THE MANUFACTURE OF SHEETS OF GLASS

Application filed November 21, 1928, Serial No. 320,786, and in France November 25, 1927.

The object of the present invention is to make various improvements in apparatus for the manufacture of sheets of glass and especially for the manufacture of rough glass from which polished plate glass can be made. The object is:—

1. To prevent the mass of hot molten glass, at its maximum temperature for casting, from coming into contact with the cylinders and heating them to an exaggerated and irregular degree, thereby producing abnormal expansion of the said cylinders, which causes uneven thickness in the cast sheets;

2. To prevent disablement of the cylinders which are expensive by keeping the mass of hot glass out of contact with the said cylinders;

3. To convey the glass to the cylinders in the form of an almost even sheet and not in a flood of glass thrown at random against the cylinder. If the mass of hot glass is not in contact with the cylinders, the cylinders cannot be put out of shape to an unusual degree and the sheet of glass made is of the same thickness throughout;

4. To keep the temperature regular and to maintain a uniform mass of molten glass, owing to the fact that the said mass is in contact with a minimum surface of metal and a minimum of ambient air;

5. To reduce to a minimum the effects of annealing on rough glass for plate glass by decreasing to a minimum its contact with the metal sides which produce, by their great conductivity, a hardening effect;

6. To obtain, by the regularity of the level of the glass in the funnel and the pre-rolling of the sheet of glass sheets with a straight head and straight lower edge. Thus, the sheets are substantially rectangular, enabling use to be made of the maximum squared surface without making hot cuts with ensuing losses or starting cracks thereby;

7. In particular, to avoid the waste sometimes styled "culot" (residue in the funnel) produced in the ordinary methods of manufacture owing to the fact that the mass of glass poured on to the table is motionless on and against this table. The culot (residue in the funnel) results in a bad utilization of the molten glass poured out. In my process the molten glass when poured out is fed to pre-rolling cylinders which form a sheet of glass for the final rolling cylinders. The glass rolls in the funnel down its sides, and owing to this motion the formation of a residue is impossible;

8. To reduce greatly labour by omission of (1) compression (2) cleaning (3) working the casting cylinders. Other objects of secondary importance are explained in the following description.

The plant by which these different results can be obtained has the characteristics described below, the novelty of the apparatus being pointed out in the accompanying claim.

The preferred form of the invention is shown in the accompanying drawings, wherein:—

The plant comprises a feeding funnel 11 having hollow sides 19 through which a heating or cooling fluid can circulate. The glass from a pot or crucible or from a furnace tank is poured into this funnel.

The cylinders $25^2$, $25^1$ being stopped at the beginning of rolling, the level of the glass forms horizontally in the funnel 11 and the head of the sheet will naturally be almost linear, parallel with the cylinders $25^1$, $25^2$. It will be the same with the tail of the sheet, and its lower end will also be parallel with the cylinders $25^1$, $25^2$.

The funnel 11 which is rigid has a slot 12 followed by the pre-rolling cylinders $25^1$, $25^2$, with a circulation of fluid. These cylinders are regulatable by the parts $29^1$, $29^2$ so as to be able to vary, as required, the free space $e$ between them to produce a sheet of glass of the required thickness.

Figure 1:
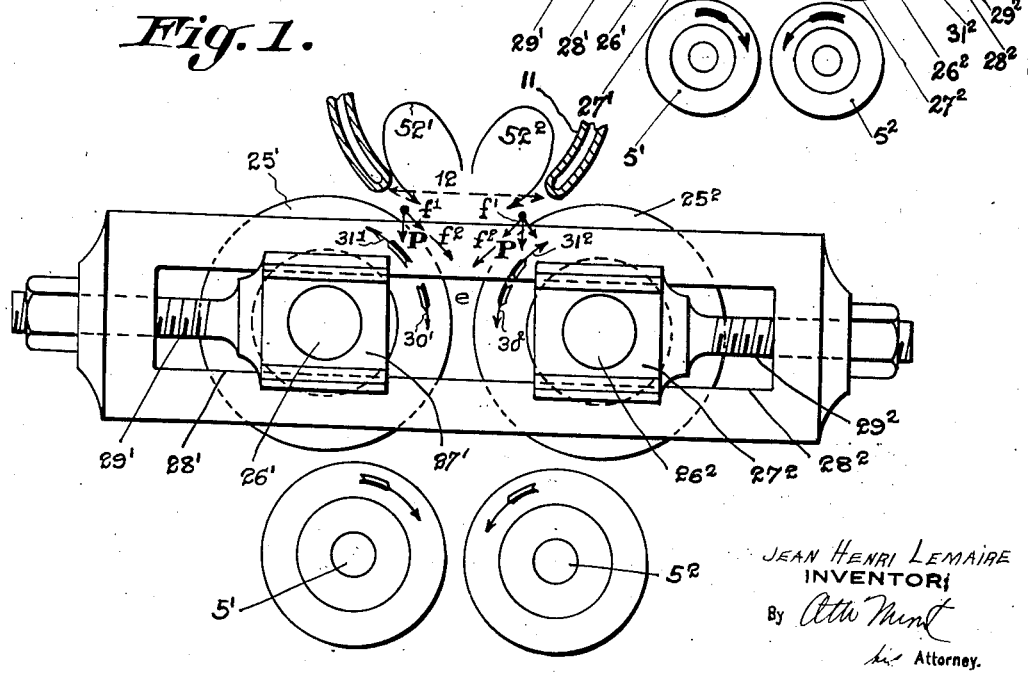
Fig. 1 is a vertical section of the plant for casting by means of a pot.

Regulation of the cylinders $25^1$, $25^2$ is effected (Fig. 1) by the displacement of the parts $29^1$, $29^2$, acting on the bearings $27^1$, $27^2$ supporting the axes $26^1$, $26^2$ of the cylinders $25^1$, $25^2$, the said bearings $27^1$, $27^2$ being maintained by slides $28^1$, $28^2$.

The cylinders $25^1$, $25^2$, rotate in the direction of the arrows $30^1$, $30^2$, or in the opposite way, as indicated by arrows $31^1$, $31^2$. In the first case (arrows $30^1$, $30^2$) the cylinders $25^1$, $25^2$, exert a tensile stress on the glass in funnel 11, and this stress produces a movement of the said glass in the direction of the arrow $52^1$, $52^2$. This movement is the resultant of the force $f^1$, the component of sliding, of the force of gravity P, and of the tangential force $f^2$ due to the cylinders $25^1$, $25^2$. Thus the glass in the funnel cannot descend, owing to cooling of the glass on its sides, nor can there be a formation of residue in the funnel. (As a residue cannot be rolled it is a source of considerable loss.) In my process the effect of the forces $f^1 + f^2$, makes the glass slide continually down the sides of the funnel 11, and this motion prevents the formation of residue if the cylinders $25^1$, $25^2$ turn as in the directions of arrows $30^1$, $30^2$. When, on the contrary, the cylinders $25^1$, $25^2$, rotate according to arrows $31^1$, $31^2$ the greater force $f^2$ opposing $f^1$ arrests the movement of the glass and consequently its flow, if the velocity of the cylinders $25^1$, $25^2$ is sufficient.

In this case there is no danger to the parts of the rolling machine which come after the cylinders $25^1$, $25^2$.

On leaving the cylinders $25^1$, $25^2$ the glass has undergone a first conformation and the sheet of glass then passes between the final cylinders $5^1$, $5^2$ of the train, there acquiring a definite even thickness at all parts of its surface. This regularity is due to the fact that the rolling cylinders $5^1$, $5^2$, do not receive an uneven mass of glass but an already-rolled sheet of glass from the cylinders $25^1$, $25^2$. Thus the cylinders $5^1$, $5^2$ cannot be heated and abnormally expanded.

The arrangements of the adjusting cylinders described can be advantageously combined with roller conveyors or table conveyors to carry the sheets of glass obtained to the annealing apparatus. The number and kind of rolling cylinders can be changed as required, for example, so as to produce glass with an impression on one or both sides of the sheet, or metallized glass.

The positioning of the regulating cylinders $25^1$, $25^2$ independently of the funnel 11 makes it possible for the delivery of glass to be regulated either by variation of the width $e$ through operation of the parts $29^1$, $29^2$ or by variation of the speed or direction of rotation of the rollers $25^1$, $25^2$.

The temperature and uniformity of the mass of glass in the funnel 11 remain regular owing to the slight contact between this mass and the metal parts, to the fact that the mass of glass presents a minimum radiating surface to the ambient air, and also owing to the movement of the glass in the direction of the arrows $52^1$, $52^2$.

Contact between the mass of hot glass and the cylinders $25^1$, $25^2$ is not disadvantageous as the said cylinders are only intended to regulate the delivery of glass and assure a preliminary shaping of the glass in the form of a sheet, the said cylinders only executing a preparatory piece of work.

Finally, very little manual labour is required with the plant, compared with known methods, owing to the omission of the operations of compression, the operations of cleaning, the operations of working and displacing the casting cylinders, and the operations of the removal of the residue from the funnel.

The plant allows of a maximum utilization of the available glass poured from the pot or conveyed from the tank furnace and by the maximum yield of the melting furnace and feed.

Figure 2:
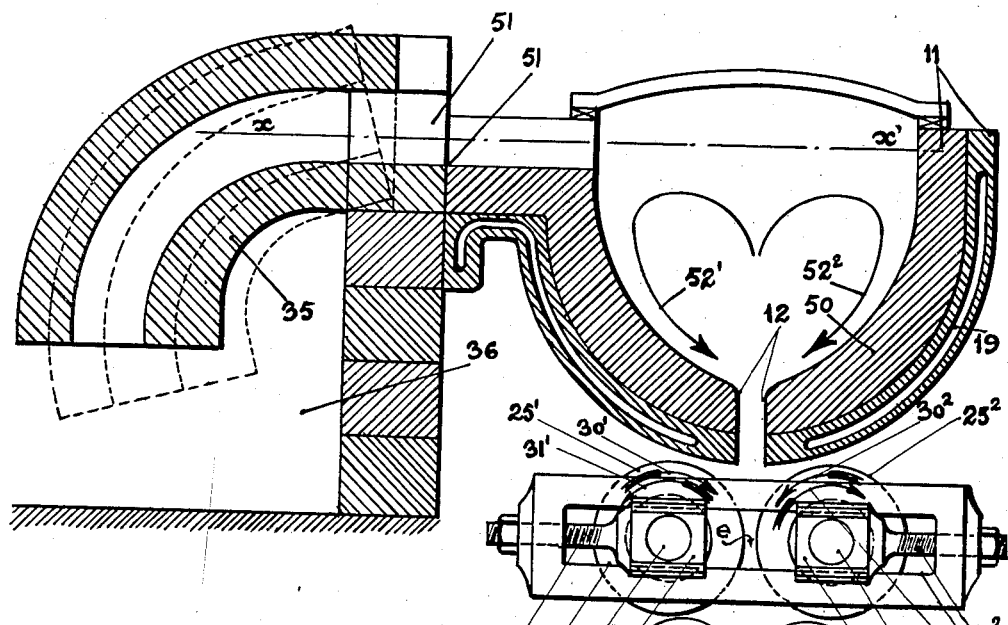
Fig. 2 is a vertical section of the plant for casting by means of a tank.
Figure 3:
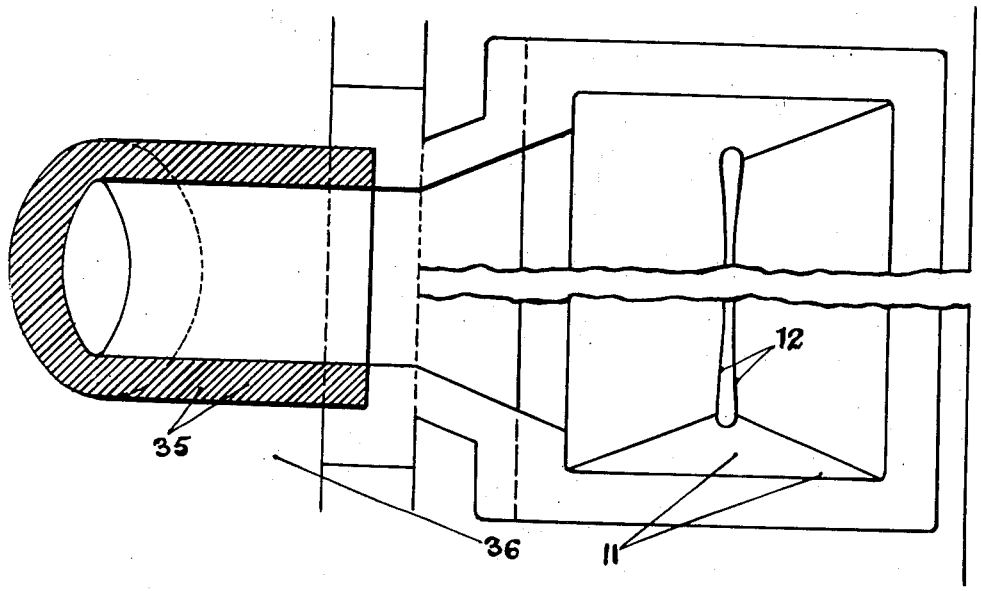
Fig. 3 is a part-sectional plan view of Fig. 2.
Figure 4:
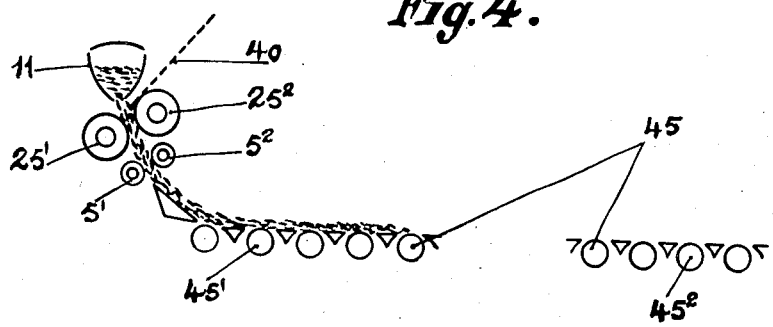
Fig. 4 is a diagrammatic view of a plant.

In the case of a continuous feed from a tank furnace, the funnel 11 and the tank furnace 36 are connected by the device of Fig. 2 which is a vertical section of the plant. Fig. 3 is a part-sectional plan view of the said plant.

As described previously the plant comprises a funnel 11 with an outer jacket 19 for the circulation of water or cold air. This funnel is fed from a hood 35 which dips into a tank furnace 36 at a certain distance from the refractory sides thereof. The level $x$—$x$ of the molten glass in the funnel 11 and tank furnace 36 is above the communicating opening between the two vessels. Foreign matter, such as fragments of refractory materials floating on the surface of the molten glass in the tank furnace 36, is arrested by the outer walls of the hood and cannot enter the funnel 11. If some of the foreign matter, from the hood itself, for example, finds its way into the funnel 11, as it floats on the surface it can easily be collected and thrown away.

Thus there is always very pure glass in the funnel, which allows of the manufacture of very pure sheets of glass, ready for the market, with a minimum waste.

The hood 33 is mounted on the side wall of the tank furnace 36 so as to be able to take an inclined position relatively to this wall with the edge 51 of the hood rising above the level $x$ $x^1$ of the glass in the furnace 36 and thus intercepting the passage of glass from the furnace into the funnel 11.

The funnel 11, which is a rigid assemblage without movable sides, has a single slot 12 for flow of the glass the profile of which is clearly shown in Fig. 3. The central part of this profile is contracted and the ends are enlarged slightly. This particular shape makes it possible for a sheet of glass of a width equal to the length of the slot to be obtained, in spite of the additional resistance against flow experienced at the extremities of the slot. The slight variation in the thickness of the sheet of glass is not disadvantageous because the sheet is immediately levelled by the cylinders $25^1$, $25^2$, as already described.

What I claim as my invention and desire to secure by Letters Patent is:—

In an installation for the manufacture of sheet glass, a hopper having rigid lateral and bottom walls, said bottom wall being provided with a fixed slot for discharging the glass in thin sheets, the slot in the said bottom wall having a narrow central portion and enlarged end portions, whereby the glass from the hopper spreads along the entire length of the slot, in opposition to the resistance offered to the flowing glass by the walls of the slot, two flow regulating rollers arranged below and spaced from the slot to provide therebetween clearance space for the passing sheet, said rollers being independent of said walls including the bottom of said hopper, means for regulating the position of one of the rollers with respect to the other and the clearance space for passing the glass sheet, and finishing gauge rollers to receive the glass sheet from the said regulating rollers.

In testimony whereof I have signed this specification.

JEAN HENRI LEMAIRE.